United States Patent [19]

Pidaparti

[11] Patent Number: 5,338,452
[45] Date of Patent: Aug. 16, 1994

[54] HIGH RATE ANAEROBIC REACTOR FOR PRIMARY TREATMENT OF HIGH STRENGTH WASTEWATER

[75] Inventor: Surya R. Pidaparti, Eagan, Minn.

[73] Assignee: The Lemna Corporation, Mendota Heights, Minn.

[21] Appl. No.: 4,520

[22] Filed: Jan. 14, 1993

[51] Int. Cl.$^5$ ............................................. C02F 3/28
[52] U.S. Cl. ...................................... 210/603; 210/608; 210/188; 210/194; 210/253; 210/DIG. 9
[58] Field of Search ............... 210/603, 605, 612, 630, 210/110, 188, 194, 195.3, 205, 207, 253, 256, 259, 608, DIG. 9

[56] References Cited

U.S. PATENT DOCUMENTS

| | | | |
|---|---|---|---|
| 2,188,162 | 1/1940 | Schulhoff | 210/629 |
| 3,385,786 | 5/1968 | Klock | 210/629 |
| 3,760,946 | 9/1973 | Boler | 210/152 |
| 3,839,198 | 10/1974 | Shelef | 210/150 |
| 3,959,923 | 6/1976 | Selke | 47/1.4 |
| 4,274,838 | 6/1981 | Dale et al. | 210/612 |
| 4,333,837 | 6/1982 | Plosz et al. | 210/602 |
| 4,530,762 | 7/1985 | Love | 210/603 |
| 4,663,044 | 5/1987 | Goronszy | 210/610 |
| 4,806,251 | 2/1989 | Durda | 210/747 |
| 4,885,094 | 12/1989 | Srinivasan et al. | 210/612 |
| 5,137,636 | 8/1992 | Bundgaard | 210/605 |
| 5,185,079 | 2/1993 | Dague | 210/603 |
| 5,192,442 | 3/1993 | Piccirillo et al. | 210/605 |

FOREIGN PATENT DOCUMENTS

| | | |
|---|---|---|
| 153297 | 8/1985 | European Pat. Off. |
| 158700 | 2/1983 | German Democratic Rep. |
| 1373035 | 11/1974 | United Kingdom |

OTHER PUBLICATIONS

Bisanco Inc., Bio-Separator Advertisement.
Rich, Linvil, G., *Public Works,* pp. 35–36, Apr. 1983, "Aerated Lagoon Systems with Improved Performance".
Dague, R. R., Habben, C. E. and Pidaparti, S. R., *Wat. Sci. Tech.,* vol. 26, No. 9–11, pp. 2429–2432, 1992, "Initial Studies on the Anaerobic Sequencing Batch Reactor".
Dague, Richard R., McKinney, Ross E. and Pfeffer, John T., *Journal, Water Pollution Control Federation,* pp. 220–226, Feb. 1966, "Anaerobic Activated Sludge".
Dague, Richard R., McKinney, Ross E. and Pfeffer, John T., *Anaerobic Waste Treatment,* vol. 42, No. 2, Part 2, pp. R31–R45, "Solids Retention in Anaerobic Waste Treatment Systems".
Sung, Shihwu and Dague, Richard R., *Water Environment Federation 65th Annual Conference,* pp. 171–183, Sep. 1992, "Laboratory Studies and Modeling of the Anaerobic Sequencing Batch Reactor Process".
Dague, Richard R. and Pidaparti, Surya R., *46 Purdue University Industrial Waste Conference Proceedings,* pp. 751–760, May 1991, "Anaerobic Sequencing Batch Reactor Treatment of Swine Wastes".

*Primary Examiner*—Christopher Upton
*Attorney, Agent, or Firm*—Kinney & Lange

[57] ABSTRACT

An anaerobic reaction system for treatment of a continuous flow of wastewater comprises a wastewater inlet, a first anaerobic reactor connected to the inlet, a second anaerobic reactor connected to the inlet and parallel to the first reactor, and a split box between the inlet and the first and second reactor. The split box channels the continuous flow of wastewater to the first reactor and to the second reactor. Effluent empties from the first reactor while wastewater in the second reactor is anaerobically reacted upon and clarified. Alternately, effluent empties from the second reactor while wastewater contained in the first reactor is anaerobically reacted upon and clarified.

23 Claims, 6 Drawing Sheets

HIGH RATE ANAEROBIC REACTOR FOR PRIMARY TREATMENT OF HIGH STRENGTH WASTEWATER

BACKGROUND OF THE INVENTION

The present invention relates to wastewater treatment systems and in particular to anaerobic reactors for treatment of wastewater.

Anaerobic processes have been used for several decades to treat wastewater in the United States. To anaerobically treat wastewater, the wastewater must first be exposed to bacteria. The bacteria convert organics in the wastewater into carbon dioxide and methane. This conversion is done in the absence of $O_2$, $NO_3$, and $SO_4$. During this conversion, protons are transferred to carbon atoms to form methane.

Several bacteria are involved in the process. These bacteria can be divided into four groups. Hydrolytic or fermentative bacteria serve to convert complex sugars, proteins and fats to sugars, amino acids and fatty acids by the addition of water. Acetogenic bacteria convert sugars, amino acids and fatty acids to acetic acid and one-carbon compounds. Homoacetogenic bacteria synthesize acetic acid to form carbon dioxide and formate. The last group of bacteria, methanogenic bacteria, break down acetate to form methane and carbon dioxide. Of all the steps, the energy released is the smallest in the synthesis of methane.

During anaerobic digestion of organics within the wastewater to be treated, bacteria become attached to solid waste or other media suspended within the wastewater. As a result, bacteria may become clustered within distinct areas or pockets of the wastewater. Therefore, the wastewater is preferably mixed to maximize the volume of wastewater coming into contact and being digested and converted by the bacteria.

The time a system requires to convert organics and the system's efficiency for removing organics depend upon the number of bacteria in the wastewater during treatment. Moreover, because bacteria die without organic wastewater to digest, the bacterial count is also critical to the survival of the system during shutdown of the system. Methanogens, the final group of bacteria which convert acetate to methane and carbon dioxide, are the slowest multiplying and the most susceptible of all the bacteria. Thus, any anaerobic process must insure that the number of methanogens in the system is maintained. The number of methanogens in an anaerobic system depends on two factors: the number of methanogens washed out of the system with the effluent and the reproductive rate of the methanogens within the wastewater.

The first factor affecting the efficiency of an anaerobic reaction system is the loss of bacteria during discharge of treated wastewater or effluent from the system. After the wastewater has been sufficiently treated to contain acceptable levels of organic material, the treated wastewater or effluent is discharged for further treatment, use or disposal. However, removing the effluent from the system also removes many of the bacterial solids suspended in the wastewater to which the bacteria have attached themselves. Consequently, this loss of bacteria, otherwise known as insufficient solids retention, results in the loss of key microorganisms followed by poor treatment efficiency and eventual failure of the anaerobic wastewater treatment system.

In an attempt to prevent insufficient solids retention, conventional systems have employed reactors with large detention times, reactors with media, or reactors with intensive management of microbial populations to achieve the high solids retention required for treatment of wastewater.

Other municipal reactors or digestors have attempted to increase solids retention by the addition of a settling step in the process, or by addition of media while keeping the solids retention time and reactor volume as small as possible. For example, systems employing an anaerobic contact process use external settling in a clarifier to achieve solids retention. However, these systems are not efficient because transportation of the wastewater to an external settling clarifier alters the settling characteristics and increases the amount of solids suspended in the wastewater. Consequently, more time is needed to sufficiently settle out the bacterial solids.

Another system which uses settling for increasing the solids retention is an anaerobic sequencing batch reactor (ASBR). These reactors use internal settling to achieve a high efficiency of organic removal (80–90 percent). The reactor is also resilient to shut down and temperature changes. Despite these advantages, the ASBR is incapable of handling a continuous flow of wastewater. Instead, the wastewater must be treated in batches. As a result, a wastewater storage facility is normally required for holding influent while a batch reacts.

Other systems have attempted to achieve increased solids retention through the use of filters and sludge blankets. Systems using anaerobic filters require media to increase solids retention. These systems have a high efficiency of removal and are resilient to shut downs and temperature changes. However, the required media is expensive.

Systems employing an upflow anaerobic sludge blanket reactor use a floating blanket of sludge to remove bacterial solids from the effluent. Although this achieves a high efficiency of removal, such a system is difficult to manage.

The second factor affecting the efficiency of an anaerobic system is the reproductive rate of the bacteria. This reproductive rate, in turn, depends on the temperature of the wastewater. In order to maintain efficiency of the anaerobic reactor and to prevent its eventual failure, the bacteria must be given sufficient time to reproduce. This minimum required time is known as the minimum solids retention time (SRT). Generally, the minimum SRT is equal to the population doubling time of the slowest methanogens At 35° C. the minimum solids retention time is around 10 days long. However, for every 10° C. drop in the temperature, the minimum SRT is doubled. Thus, the minimum SRT is much longer in non-temperate, cooler climates. Consequently, anaerobic treatment systems in non-temperate climates generally require greater time to treat wastewater.

The present invention addresses these and other problems related to anaerobic reactors in a wastewater treatment system.

SUMMARY OF THE INVENTION

An anaerobic reaction system for treatment of a continuous flow of wastewater incorporates a first anaerobic reactor and a second anaerobic reactor operated in parallel to one another and connected to a split box. The split box channels a continuous flow of wastewater to the intake of the first reactor and to the intake of the second reactor. Influent wastewater continuously fills the first reactor and the second reactor. Effluent empties from the first reactor while wastewater in the second reactor is anaerobically reacted upon and clarified. Alternately, effluent empties from the second reactor while wastewater contained in the first reactor is anaerobically reacted upon and clarified.

As an alternative, the split box may alternately channel the continuous flow of wastewater to the intake of the first reactor and to the intake of the second reactor. With this alternative, influent wastewater fills the first reactor and effluent empties from the first reactor while wastewater in the second reactor is anaerobically reacted upon and clarified. Alternately, influent wastewater fills the second reactor and effluent empties from the second reactor while wastewater contained in the first reactor is anaerobically reacted upon and clarified.

The system may also further include a cover, a grid matrix, a floating baffle, and means for mixing the wastewater. Bacterial solids which settle at a bottom of the reactors may be recirculated in the system or discharged. Gas emitted from the wastewater may be collected for mixing the wastewater or for other commercial purposes.

In another embodiment, an anaerobic reaction system for treatment of a continuous flow of wastewater incorporates a single reactor having a winding channel between an intake and an outlet. The winding channel has a first portion and a second portion and is defined by a series of dividing walls. The continuous flow of wastewater enters the first portion of the winding channel through the intake and is anaerobically reacted upon by bacteria. The continuous flow of wastewater is clarified in the second portion of the winding channel. The first portion of the winding channel contains means for mixing the wastewater contained in the first portion. The system may further include a cover and a floating barrier. Solids which settle near the second 10 portion of the winding channel may be recirculated to the first portion of the winding channel or may be discharged. Gas emitted from the wastewater may also be collected for mixing the wastewater or for other commercial purposes.

DETAILED DESCRIPTION OF THE PREFERRED EMBODIMENTS

Figure 1:
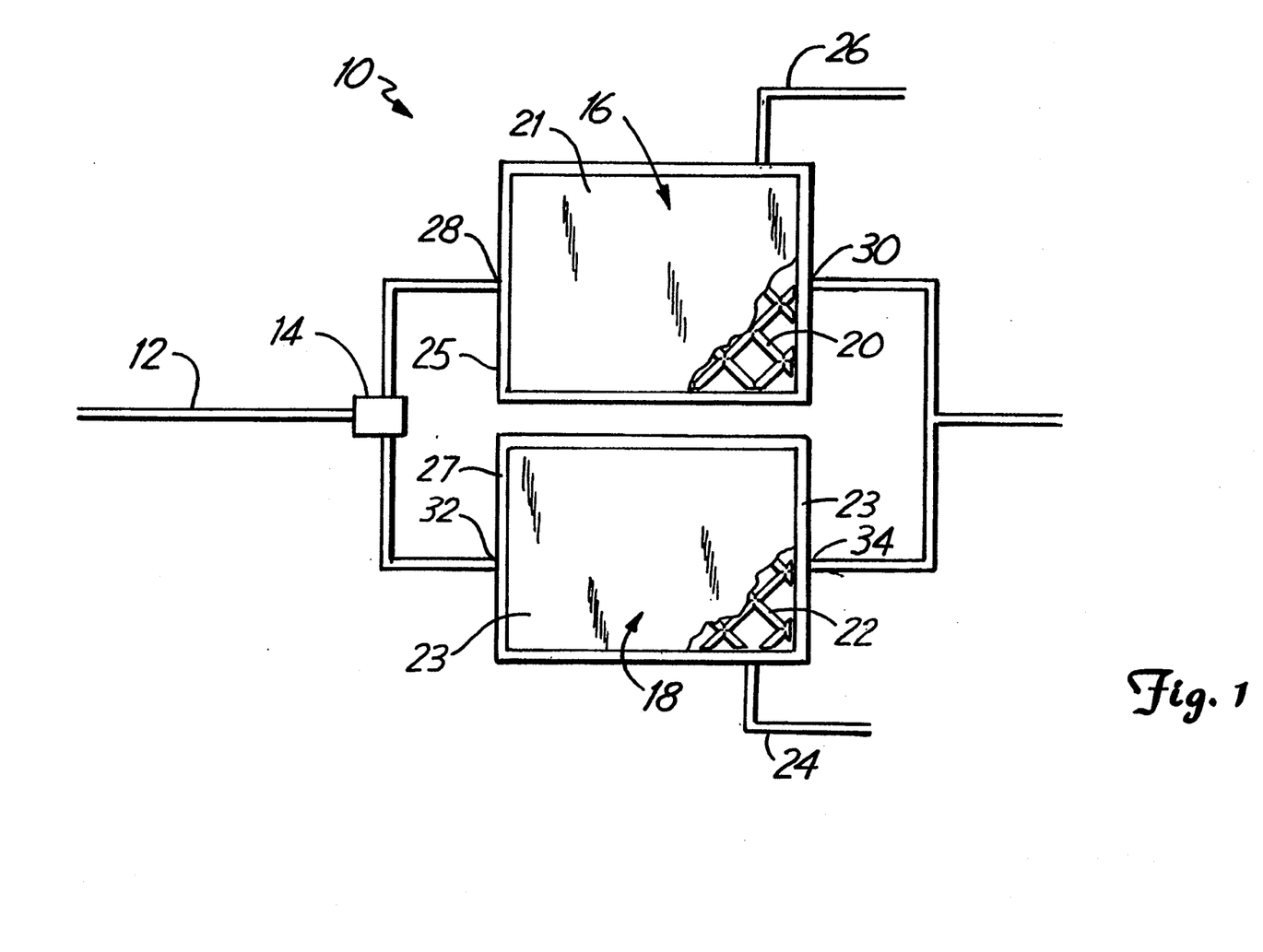
FIG. 1 is a top view of a parallel two-reactor anaerobic reaction system.

FIG. 1 shows a top view of an anaerobic reaction system 10. System 10 includes a wastewater inlet 12, a split box 14, a first reactor 16, a second reactor 18 and solids dischargers 24, 26. Reactor 16 includes grid matrix 20, cover 21, side walls 25, influent intake 28 and effluent outlet 30. Reactor 18 includes influent grid matrix 22, cover 23, side walls 27, intake 32 and effluent outlet 34. Reactors 16 and 18 are connected in parallel to the inlet 12. Split box 14 is positioned between inlet 12 and reactors 16 and 18. Solids dischargers 24, 26 are connected to reactors 18 and 16, respectively.

In operation, a continuous flow of wastewater enters system 10 at inlet 12. Split box 14 channels or divides the continuous flow of wastewater to first reactor 16 and to second reactor 18. The continuous flow of wastewater enters and fills reactor 16 through influent intake 28 and reactor 18 through influent intake 32. In this way, wastewater continuously fills first reactor 16 and second reactor 18. While wastewater in second reactor 18 is anaerobically reacted upon, mixed and clarified, treated wastewater or effluent is discharged from first reactor 16 through effluent outlet 30. While wastewater contained in first reactor 16 is anaerobically reacted upon, mixed and clarified, effluent is discharged from second reactor 18 through outlet 34. Because reactors 16 and 18 are operated in parallel and are alternately discharged of effluent, anaerobic reaction system 10 is capable of treating a continuous flow of wastewater.

Alternatively, split box 14 alternately channels or divides the continuous flow of wastewater to first reactor 16 and second reactor 18. The continuous flow of wastewater alternately enters and fills reactor 16 through influent intake 28 and reactor 18 through influent intake 32. In this way, wastewater fills first reactor 16 while wastewater in second reactor 18 is anaerobically reacted upon, mixed and clarified. At the same time, treated wastewater or effluent is discharged from first reactor 16 through effluent outlet 30. Wastewater fills second reactor 18 while wastewater contained in first reactor 16 is anaerobically reacted upon, mixed and clarified. During filling of second reactor 18, effluent is discharged from second reactor 18 through outlet 34. Because reactors 16 and 18 are operated in parallel, are alternately filled with influent wastewater and are alternately discharged of effluent, anaerobic reaction system 10 is capable of treating a continuous flow of wastewater.

During clarification of wastewater within reactors 16 and 18, solids containing bacteria settle to a bottom of reactors 16 and 18. Solids dischargers 24 and 26 discharge settled solids from reactors 18 and 16, respectively. This prevents reactors 16 and 18 from becoming overly filled with settled solids.

Figure 2:
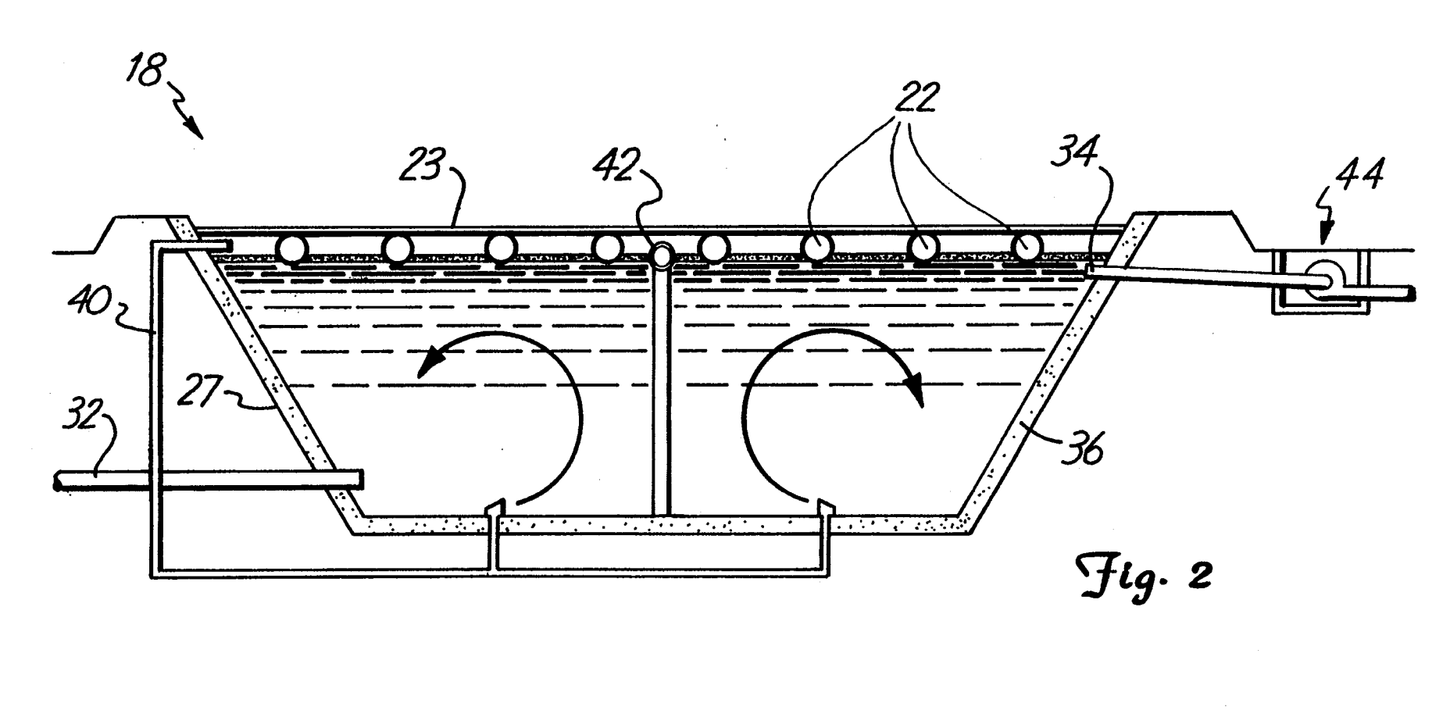
FIG. 2 is a side view of an anaerobic reactor.

FIG. 2 shows a side view of a preferred embodiment of reactor 18. Reactor 18 includes influent intake 32, wastewater container 36, grid matrix 22, cover 23, gas mixer 40, floating baffle 42, effluent outlet 34, and pumping station 44. Wastewater container 36 may be constructed of any suitable container for holding a large quantity of wastewater. Container 36 may be formed by, but not limited to, concrete, metal, polymer tanks or earthen basins. The influent intake is positioned near a bottom of container 36. Cover 23 extends substantially across container 36 and is preferably supported by an interconnected grid matrix 22 formed by floating barriers at the water surface. Alternatively, cover 23 may be supported from side walls 27 of container 36. Cover 23 preferably uses a high strength synthetic material. Container 36 may be divided into channels by installation of floating baffle 42. Floating baffle 42 is preferably coupled to a bottom of container 36. Gas mixer 40 runs from just below cover 23 to a bottom of container 36. Effluent outlet 34 is located near a top surface of the wastewater.

Influent wastewater enters reactor 18 through influent intake 32. As container 36 becomes filled, bacteria convert organics contained within the wastewater into carbon dioxide and methane. Carbon dioxide and methane are emitted from the wastewater as gas. Cover 23 prevents the gas from escaping. As a result, the gas builds up between the surface of the wastewater and cover 23. Gas mixer 40 collects the gas which has built up and recirculates the gas to a bottom of container 36. Gas mixer 40 preferably uses the collected gas to mix the wastewater within container 36. By mixing the wastewater, gas mixer 40 insures that a maximum volume of the wastewater comes into contact with, and is digested by, the bacteria. As a result, a higher percentage of the organics contained in the wastewater are converted to methane and carbon dioxide. Alternatively, the methane gas collected by gas mixer 40 may be collected and used for other commercial purposes. Other means may then be used to mix the wastewater, such as rotary blades, paddles, jet nozzles and the like.

In addition to preventing the escape of gas from container 36, cover 23 also insulates container 36 to prevent heat from escaping from container 36 and to block wind from disrupting a surface sludge crust which forms on a top surface of the wastewater. The sludge crust insulates the wastewater as well. The surface sludge crust is further stabilized by grid matrix 22. Because cover 23 and the stabilized surface sludge crust both insulate wastewater within container 36, the system minimizes cooling of the wastewater within container 36. Consequently, the temperature of the wastewater is maintained, even in non-temperate climates. As a result, the reproductive rate of the bacteria in container 36 is higher, the minimum solids retention time (SRT) is reduced, and the efficiency of system 10 is increased.

After the bacteria have converted the organics within the wastewater into carbon dioxide and methane, the wastewater is clarified to settle out the bacterial solids suspended in the wastewater. The remaining effluent is then discharged from reactor 18 through effluent outlet 34. The treated wastewater or effluent is discharged from reactor 18 at the same time that influent wastewater fills reactor 18. Because outlet 34 is at a top of the wastewater and intake 32 is at a bottom of container 36, filling and emptying container 36 can be done concurrently without further mixing the influent wastewater with the treated wastewater. Location of outlet 34 and intake 32 create an upward moving "plug" effect. Pumping station 44 is used to discharge the effluent from container 36.

Figure 3A:
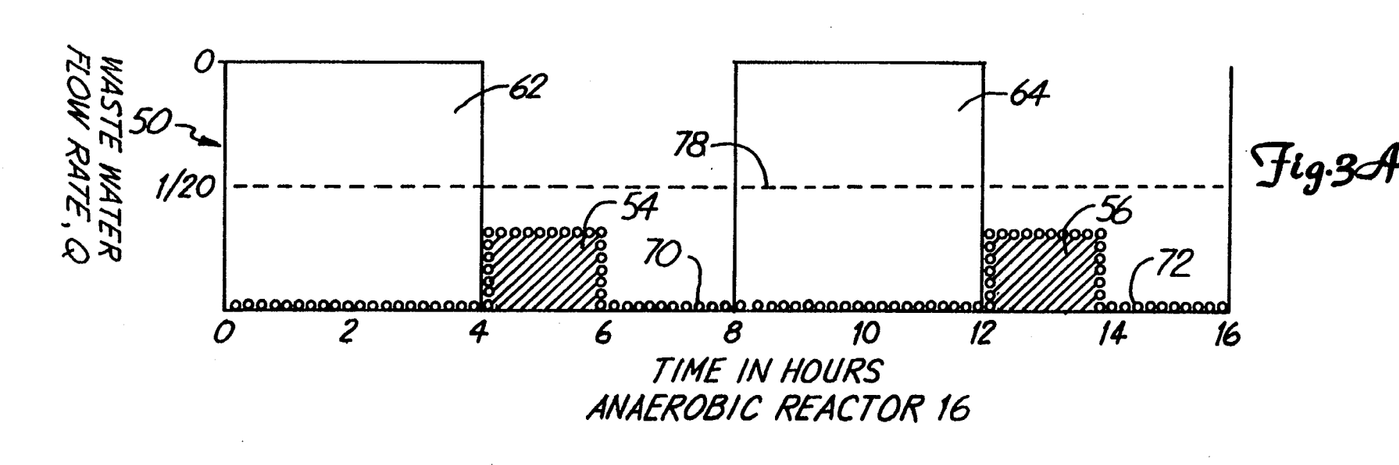
FIG. 3A is an operation schematic for a first reactor in a parallel two-reactor anaerobic reaction system.
Figure 3B:
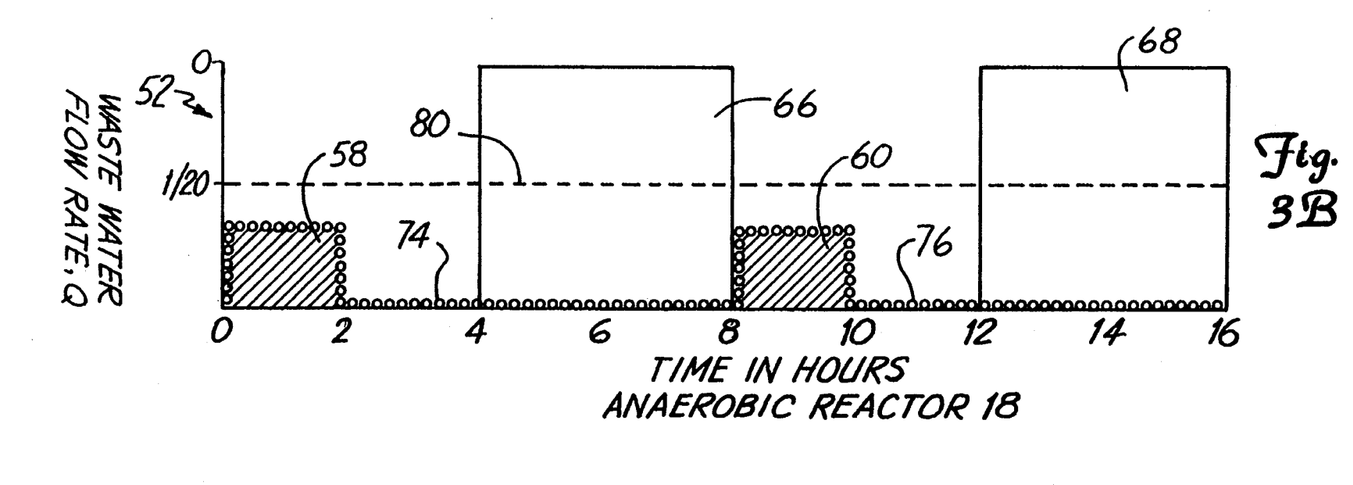
FIG. 3B is an operation schematic for a second reactor in a parallel two-reactor anaerobic reaction system.

FIGS. 3A and 3B show an operation schematic for the parallel two-reactor anaerobic system 10. Cycle 50 of FIG. 3A shows an operation schematic for reactor 16. Cycle 52 of FIG. 3B shows an operation schematic for reactor 18. Shaded regions 54, 56, 58 and 60 represent mixing periods in which the wastewater is mixed and agitated. Open block regions 62, 64, 66 and 68 represent time periods in which the treated wastewater or effluent is discharged from reactors 16 and 18. Flat lying regions 70, 72, 74 and 76 represent time periods in which the wastewater is clarified to settle out bacterial solids from the effluent. Dashed lines 78 and 80 represent the inflow of wastewater into each reactor 16 and 18.

As shown in FIGS. 3A and 3B by dashed lines 78 and 80, influent wastewater to be treated continuously enters reactors 16 and 18 during cycles 50 and 52. During region 62, effluent is discharged from reactor 16. During the same period, as represented by regions 58 and 74, wastewater within reactor 18 is mixed (region 58) and then clarified or settled (region 74). Next, as represented by regions 54 and 70, wastewater in reactor 16 is mixed and clarified. At the same time, as represented by region 66, treated wastewater or effluent is discharged from reactor 18. Cycles 50 and 52 continue concurrently and indefinitely.

Figure 4A:
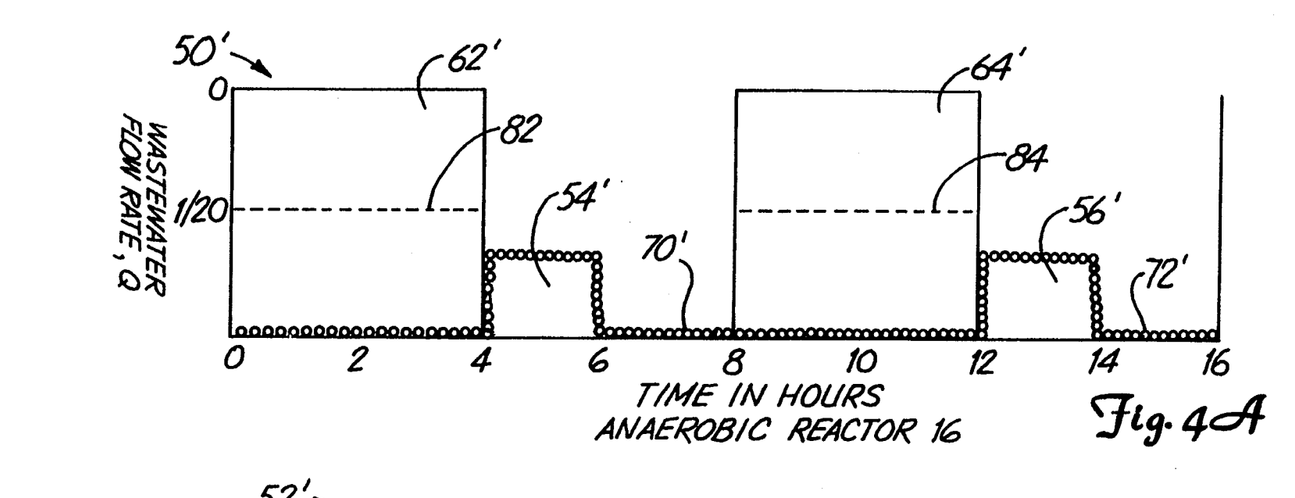
FIG. 4A is an alternative operation schematic for a first reactor in a parallel two-reactor anaerobic reaction system.
Figure 4B:
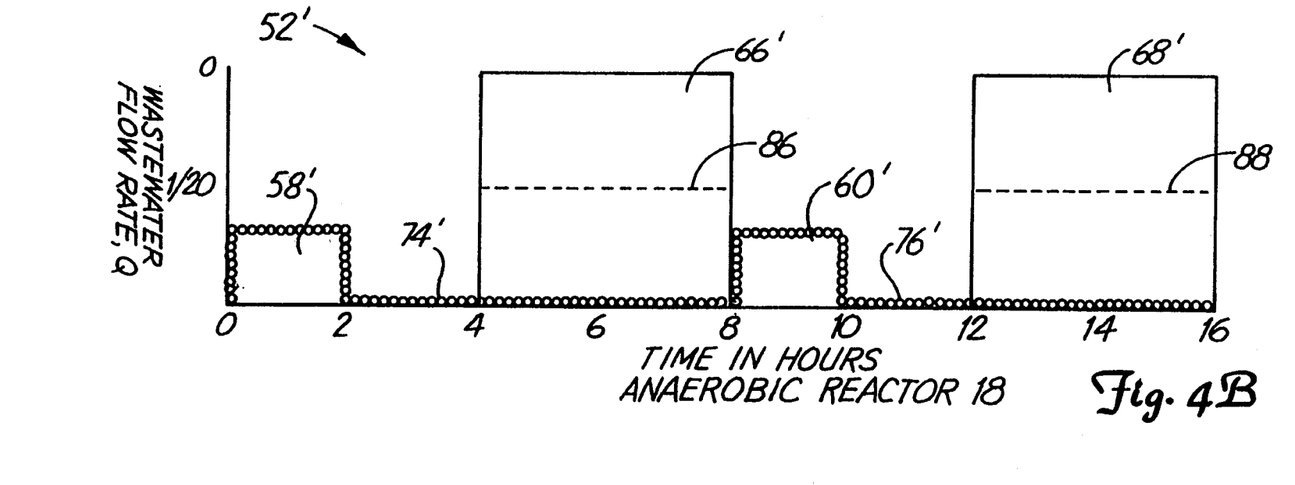
FIG. 4B is an alternative operation schematic for a second reactor in a parallel two-reactor anaerobic reaction system.

FIGS. 4A and 4B show an alternate operation schematic for the parallel two-reactor anaerobic system 10. Cycle 50' of FIG. 4A shows an operating schematic for reactor 16. Cycle 52' of FIG. 4B shows an operation schematic for reactor 18 Shaded regions 54', 56', 58' and 60' represent mixing periods in which the wastewater is mixed and agitated. Open block region 62', 64', 66' and 68' represent time periods in which wastewater fills reactor 16 and 18 and time periods in which the treated wastewater or effluent is discharged from reactors 16 and 18 Flat lying regions 70', 72', 74' and 76' represent time periods in which wastewater is clarified to settle out bacterial solids from the effluent. Dashed lines 82 and 84 represent the inflow of wastewater into reactor 16. Dashed lines 86 and 88 represent the inflow wastewater into reactor 18.

As shown in FIGS. 4A and 4B, influent wastewater to be treated alternately enters reactors 16 and 18 during cycles 50' and 52'. In contrast to cycles 50 and 52 as shown in FIGS. 3A and 3B, in cycles 50' and 52', the influent wastewater does not enter reactors 16 and 18 while wastewater within 16 and 18 is mixed and clarified. As represented by dashed line 82 and region 62', influent wastewater enters reactor 16 while effluent is discharged from reactor 16. During the same period, as represented by regions 58' and 74', wastewater within reactor 18 is mixed (region 58') and then clarified or settled (region 74').

Next, as represented by regions 54' and 70 ', wastewater in reactor 16 is mixed and clarified. However, during this time period, the continuous flow of effluent wastewater enters reactor 18 and treated wastewater or effluent is discharged from reactor 18 (region 66'). Cycles 50' and 52' continue concurrently and indefinitely.

Figure 5:
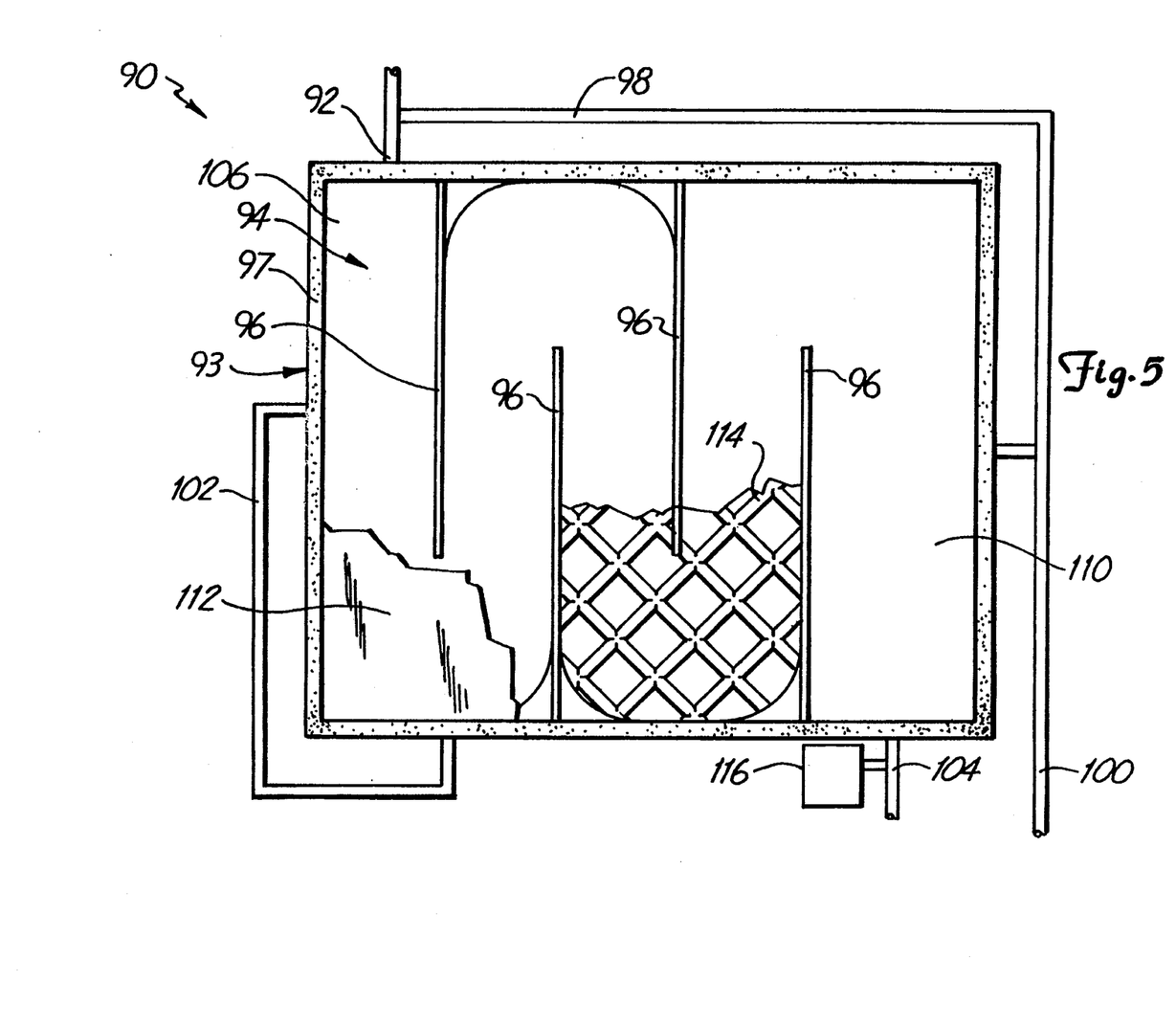
FIG. 5 is a top view of an anaerobic reaction system with a winding channel defined by a series of dividing walls.
Figure 6:
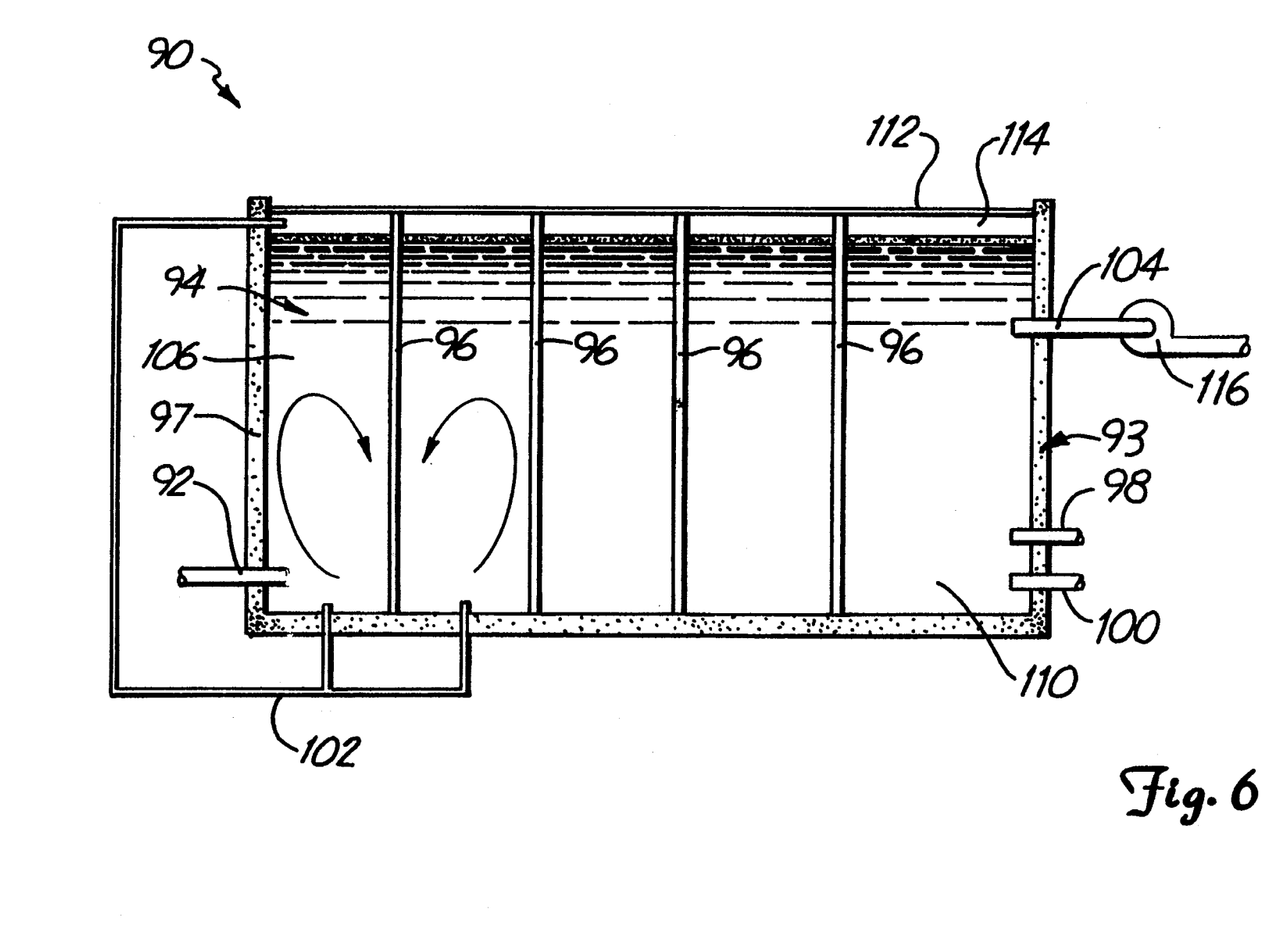
FIG. 6 is a side view of the anaerobic reaction system of FIG. 5.

FIGS. 5 and 6, when taken together, best describe another embodiment of an anaerobic reactor 90. FIG. 5 shows a top view of reactor 90, while FIG. 6 shows a cross-sectional view of reactor 90. As shown in FIG. 5, reactor 90 includes wastewater intake 92, wastewater container 93, winding channel 94, dividing walls 96, side walls 97, solids recirculator 98, solids discharger 100, gas mixer 102, cover 112, floating barriers 114, effluent outlet 104, and pump 116. Winding channel 94 runs between intake 92 and outlet 104 and has first portion 106 and second portion 110. Solids recirculator 98 runs from second portion 110 of winding channel 94 to a point upstream of intake 92. Solids discharger 100 is connected to second portion 110 of winding channel 94 and runs to any desired discharge location.

As shown in FIG. 6, wastewater intake 92 is located proximate to a bottom of wastewater container 93 in first portion 106 of winding channel 94. Wastewater outlet 104 is positioned proximate to a surface of the wastewater in second portion 110 of winding channel 94. Gas mixer 102 runs from a top surface of the wastewater below cover 112 within winding channel 94 to a bottom of container 93 in first portion 106 of winding channel 94. Cover 112 is preferably constructed from a floating high strength synthetic material. Cover 112 is preferably suspended from dividing walls 96 and side walls 97. Alternatively, cover 112 may be formed with an interconnected divider matrix. Cover 112 extends across and substantially covers wastewater container 93. Floating barriers 114 form a grid network across and substantially near a top surface of the wastewater. Barriers 114 are preferably attached to side walls 97 of container 93.

System 90 receives a continuous flow of wastewater through intake 92. During conversion of organics within the wastewater into carbon dioxide and methane, the wastewater emits gaseous carbon dioxide and methane. Cover 112 prevents the gas from escaping out of reactor 90. As a result, the gas builds up between a top surface of the wastewater and cover 112. Gas mixer 102 collects the gas and recirculates the gas to a bottom of container 93 in first portion 106 of winding channel 94. Gas mixer 102 discharges the collected gas at a bottom of container 93 in first portion 106 to intermittently mix the wastewater. In the alternative, the wastewater in first portion 106 of winding channel 94 need not be mixed by recirculated gas, but may be mixed with any appropriate mixing equipment, such as rotating blades, water paddles, or injection nozzles. In addition, the gas collected by gas mixer 102 may be contained and used for other commercial purposes such as heating.

As wastewater slowly flows through winding channel 94, mixing intensity is gradually reduced. In second portion 110 of winding channel 94, the wastewater is clarified to allow bacterial solids to settle to a bottom of container 93 in portion 110 of winding channel 94. Solids recirculator 98 recirculates and transports the settled solids to a point upstream of intake 92. The solids are high in bacteria, therefore, by recirculating the settled solids, solids recirculator 98 maintains a high bacteria count within system 90. Solids discharger 100 discharges excess solids to prevent system 90 from becoming over filled with settled solids. Solids recirculator 98, solids discharger 100 and gas mixer 102 may be comprised of any suitable material transportation equipment, such as a pump coupled to a polyester or plastic piping. Dividing walls 96 which define the winding channel 94, may be constructed of any suitable material such as concrete, metal, earthen berms, floating baffles, high strength polymer or fabric sheets. Pump 116 discharges effluent from container 93 through wastewater outlet 104. Alternatively, pump 116 may be any suitable liquid material transportation equipment. Because outlet 104 is located proximate to a surface of the wastewater, effluent may be discharged while the wastewater is clarified in second portion 110 of winding channel 94.

Cover 112 also insulates reactor 90 to prevent cooling of the wastewater and to block wind from disrupting a surface sludge crust which forms on a top surface of the wastewater. The sludge crust is helpful because it also insulates the wastewater. Floating barriers 114 form a grid network at the surface of the container 93, and thereby serve to further stabilize the surface sludge crust. Together, cover 112 and the stabilized surface sludge crust insulate wastewater within container 93 to minimize cooling of the wastewater. As a result, the temperature of the wastewater is maintained, even in non-temperate, cooler climates. Because the temperature is maintained, the reproductive rate of the bacteria in container 93 is higher, the minimum solids retention time (SRT) is reduced and the efficiency of system 90 is increased.

Although the present invention has been described with reference to preferred embodiments, workers skilled in the art will recognize that changes may be made in form and detail without departing from the spirit and scope of the invention.

What is claimed is:

1. An anaerobic reaction system for treatment of wastewater containing solids with anaerobic bacteria wherein the solids accumulate on a surface of the wastewater to form a surface sludge crust on the wastewater, the system comprising:

a wastewater container for containing the wastewater and the bacteria while the bacteria anaerobically react with the wastewater;

an influent intake, connected to the wastewater container, for receiving wastewater from the wastewater inlet; and an effluent outlet, connected to the wastewater container, for discharging treated wastewater from the container after the solids settle from the wastewater to clarify the wastewater; and a grid matrix deployed near the surface on the wastewater in the wastewater container, the matrix forming means for stabilizing the surface sludge crust.

2. The system of claim 8 including:

means for mixing the wastewater within the wastewater container.

3. The system of claim 1 wherein the wastewater container includes covering means for covering the wastewater container.

4. The system of claim 3 wherein the wastewater container includes walls and wherein the covering means comprise:

a floating synthetic cover suspended from the walls.

5. The system of claim 1 including:

gas collection means for collecting gas emitted from the wastewater.

6. The system of claim 5 including:

means, coupled to the gas collection means, for recirculating the gas into the wastewater.

7. The system of claim 1 including:

means for discharging solids that have settled to a bottom of the wastewater container during clarification of the wastewater.

8. The system of claim 1 wherein the influent intake is connected to the wastewater container proximate to a bottom of the wastewater container and wherein the effluent outlet is connected to the wastewater container proximate to a surface of the wastewater contained in the wastewater container.

9. The system of claim 1 wherein the wastewater container comprises:

a winding channel between the influent intake and the effluent outlet defined by a series of dividing walls, the channel having a first portion and a second portion, the continuous flow wastewater entering the first portion of the winding channel through the influent intake and is anaerobically reacted upon by the bacteria and the continuous flow of wastewater being clarified in the second portion of the winding channel; and means located in the first portion of the winding channel for mixing the continuous flow of wastewater.

10. An anaerobic reaction system for treatment of wastewater containing solids with anaerobic bacteria, wherein the solids accumulate on a surface of the wastewater to form a surface sludge crust on the surface of the wastewater in the wastewater container, the system comprising:
- a wastewater container for containing the wastewater and the bacteria while the bacteria anaerobically react with the wastewater;
- an influent intake, connected to the wastewater container, for receiving wastewater from the wastewater inlet; and
- an effluent outlet, connected to the wastewater container, for discharging treated wastewater from the container after the solids settle from the wastewater to clarify the wastewater; and
- a network of floating barriers deployed across and substantially near the surface of the wastewater in the wastewater container, so that the floating barriers form means to stabilize the surface sludge crust.

11. An anaerobic reactor for treatment of a continuous flow of wastewater containing solids with anaerobic bacteria, wherein the solids accumulate on a top surface of the wastewater to form a surface sludge crust on the wastewater, the reactor comprising:
- a wastewater intake;
- an effluent outlet for discharging the treated wastewater after the treated wastewater is clarified;
- a network of floating barriers deployed across the top surface of the wastewater, the floating barriers forming means for stabilizing the surface sludge crust;
- a winding channel between the wastewater intake and the effluent outlet defined by a series of dividing walls, the channel having a first portion and a second portion, the continuous flow of wastewater entering the first portion of the winding channel through the wastewater intake and being anaerobically reacted upon by the bacteria, wherein the dividing walls separate the first portion from the second portion so that the solids of the continuous flow of wastewater settle from the wastewater in the second portion of the winding channel; and
- means, located in the first portion of the winding channel, for mixing the continuous flow of wastewater.

12. The reactor of claim 11 comprising:
covering means for covering a top surface of the wastewater.

13. The reactor of claim 12 wherein the covering means comprises:
a synthetic cover suspended relative to the grid matrix.

14. The reactor of claim 11 further comprising:
gas collection means, coupled to the winding channel, for collecting gas emitted from the wastewater.

15. The reactor of claim 4 further comprising:
means, coupled to the collection means, for recirculating the collected gas into the wastewater.

16. The reactor of claim 11 further comprising:
means, coupled to the winding channel, for recirculating solids, which have settled to a bottom of the second portion of the winding channel, to the first portion of the winding channel.

17. The reactor of claim 11 further comprising:
means, coupled to the winding channel, for discharging solids which have settled near a bottom of the second portion of the winding channel.

18. A method for anaerobically treating a continuous flow of wastewater, the method comprising:
- channeling the continuous flow of wastewater to a first reactor to fill the first reactor, the first reactor comprising:
  - a wastewater container for containing the wastewater;
  - an influent intake for receiving the wastewater; and
  - an effluent outlet for discharging effluent from the wastewater container after being clarified;
- channeling the continuous flow of wastewater to a second reactor to fill the second reactor, the second reactor being coupled in parallel with the first reactor and comprising:
  - a wastewater container for containing the wastewater;
  - an influent intake for receiving the wastewater; and
  - an effluent outlet for discharging effluent from the wastewater container after being clarified;
- deploying a network of floating barriers across a top surface of the wastewater, so the barriers stabilize a surface sludge crust formed on the top surface of the wastewater;
- discharging effluent from the first reactor during the channeling of wastewater to the first reactor;
- anaerobically treating the wastewater in the second reactor during the discharging of effluent from the first reactor; and
- clarifying the wastewater in the second reactor during the discharging of effluent from the first reactor.

19. The method of claim 18 wherein the continuous flow of wastewater is alternately channeled to the first reactor and to the second reactor.

20. The method of claim 18 wherein anaerobically treating the wastewater further comprises:
mixing the wastewater.

21. The method of claim 18 further comprising:
covering a top surface of the wastewater; and
collecting gas emitted from the wastewater.

22. The method of claim 21 further comprising:
recirculating the collected gas into the wastewater.

23. The method of claim 18 further comprising:
discharging solids which have settled to a bottom of the first reactor and the second reactor during the clarification of the wastewater.

* * * * *

UNITED STATES PATENT AND TRADEMARK OFFICE
CERTIFICATE OF CORRECTION

PATENT NO. : 5,338,452

DATED : August 16, 1994

INVENTOR(S) : SURYA R. PIDAPARTI

It is certified that error appears in the above-indentified patent and that said Letters Patent is hereby corrected as shown below:

Col. 3, line 38, after "second", delete --10--

Col. 6, line 17, after "reactor 18", insert --.--

Col. 6, line 23, after "and 18", insert --.--

Col. 8, line 28, delete "claim 8", insert --claim 1--

Col. 9, line 57, delete "claim 4", insert --claim 14--

Signed and Sealed this

Twentieth Day of December, 1994

Attest:

BRUCE LEHMAN

*Attesting Officer*     *Commissioner of Patents and Trademarks*